United States Patent
Schneider, II

(10) Patent No.: US 10,612,767 B2
(45) Date of Patent: *Apr. 7, 2020

(54) CONNECTOR FOR AN ELECTRONIC FAUCET

(71) Applicant: Delta Faucet Company, Indianapolis, IN (US)

(72) Inventor: Randy L. Schneider, II, Carmel, IN (US)

(73) Assignee: Delta Faucet Company, Indianapolis, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/166,937

(22) Filed: Oct. 22, 2018

(65) Prior Publication Data

US 2019/0056100 A1    Feb. 21, 2019

Related U.S. Application Data

(62) Division of application No. 15/400,710, filed on Jan. 6, 2017, now Pat. No. 10,113,739.

(51) Int. Cl.
| | | |
|---|---|---|
| F21V 33/00 | (2006.01) | |
| E03C 1/05 | (2006.01) | |
| F21V 8/00 | (2006.01) | |
| E03C 1/04 | (2006.01) | |
| F21V 23/04 | (2006.01) | |
| F21V 23/06 | (2006.01) | |

(52) U.S. Cl.
CPC .......... *F21V 33/004* (2013.01); *E03C 1/0401* (2013.01); *E03C 1/057* (2013.01); *F21V 23/0457* (2013.01); *F21V 23/06* (2013.01); *G02B 6/0008* (2013.01); *E03C 2001/0418* (2013.01); *G02B 6/0006* (2013.01)

(58) Field of Classification Search
CPC ....................................................... F21V 23/06
USPC ............................................ 4/506, 619, 623
See application file for complete search history.

(56) References Cited

U.S. PATENT DOCUMENTS

| | | | |
|---|---|---|---|
| 4,299,251 A | 11/1981 | Dugas | |
| 4,823,414 A | 4/1989 | Piersimoni et al. | |
| 4,986,303 A | 1/1991 | Kennedy | |
| 5,570,869 A | 11/1996 | Diaz et al. | |

(Continued)

FOREIGN PATENT DOCUMENTS

| | | |
|---|---|---|
| CN | 201439831 | 4/2010 |
| CN | 201496622 | 6/2010 |

(Continued)

OTHER PUBLICATIONS

TSBras-2015; EC-3130 & EC-3132 Check Point Above Deck Electronic Faucets; retrieved at https://www.tsbrass.com/drawings/098/098-018674-45.pdf; dated Oct. 22, 2015.

(Continued)

*Primary Examiner* — Lori L Baker
(74) *Attorney, Agent, or Firm* — Faegre Drinker Biddle & Reath LLP

(57) ABSTRACT

A connector for an electronic faucet including a light source. The connector includes a socket and is configured to distinguish between an electrically conductive plug and an electrically non-conductive plug for controlling activation of the light source.

20 Claims, 10 Drawing Sheets

(56) References Cited

U.S. PATENT DOCUMENTS

| | | |
|---|---|---|
| 6,006,784 A | 12/1999 | Hidetaka et al. |
| 6,082,407 A | 7/2000 | Paterson et al. |
| 6,109,797 A | 8/2000 | Nagura et al. |
| 6,126,290 A | 10/2000 | Veigel |
| 6,317,717 B1 | 11/2001 | Lindsey et al. |
| 6,374,850 B1 | 4/2002 | Timm |
| 6,513,787 B1 | 2/2003 | Jeromson et al. |
| 6,588,938 B1 | 7/2003 | Lampert et al. |
| 6,688,779 B2 | 2/2004 | Nishita |
| 6,691,340 B2 | 2/2004 | Honda et al. |
| 6,719,461 B2 | 4/2004 | Cull |
| 6,805,458 B2 | 10/2004 | Schindler et al. |
| 6,973,582 B2 | 12/2005 | Sugiura |
| 7,008,073 B2 | 3/2006 | Stuhlmacher |
| 7,150,293 B2 | 12/2006 | Jonte |
| 7,228,874 B2 | 6/2007 | Bolderheij et al. |
| 7,326,087 B2 | 2/2008 | Gerlach et al. |
| 7,354,205 B2 | 4/2008 | Sakata et al. |
| 7,361,140 B2 | 4/2008 | Ries et al. |
| 7,427,165 B2 | 9/2008 | Benaron et al. |
| 7,458,520 B2 | 12/2008 | Belz et al. |
| 7,458,732 B2 | 12/2008 | Harano et al. |
| 7,467,874 B2 | 12/2008 | Gautschi et al. |
| 7,481,585 B2 | 1/2009 | Scadden et al. |
| 7,537,023 B2 | 5/2009 | Marty et al. |
| 7,537,489 B2 | 5/2009 | Feridani et al. |
| 7,624,757 B2 | 12/2009 | Schmitt |
| 7,650,653 B2 | 1/2010 | Johnson et al. |
| 7,654,858 B2 | 2/2010 | Geiger |
| 7,677,813 B2 | 3/2010 | Anrig et al. |
| 7,690,395 B2 | 4/2010 | Jonte et al. |
| 7,727,029 B2 | 6/2010 | Bolin et al. |
| 7,748,070 B2 | 7/2010 | Chan et al. |
| 7,896,708 B2 | 1/2011 | Agevik |
| 7,997,301 B2 | 8/2011 | Marty et al. |
| 8,103,807 B2 | 1/2012 | Stenmark et al. |
| 8,148,921 B2 | 4/2012 | Elbelbaum |
| 8,376,630 B2 | 2/2013 | Wang et al. |
| 8,496,025 B2 | 7/2013 | Parsons et al. |
| 8,572,772 B2 | 11/2013 | Wolf et al. |
| 8,573,861 B2 | 11/2013 | Terlizzi et al. |
| 8,577,195 B2 | 11/2013 | Terlizzi et al. |
| 8,651,750 B2 | 2/2014 | Terlizzi et al. |
| 8,682,172 B2 | 3/2014 | Priyadarshi |
| 8,696,220 B2 | 4/2014 | Wu |
| 8,702,325 B2 | 4/2014 | Wu |
| 8,708,575 B2 | 4/2014 | Hung et al. |
| 8,714,836 B2 | 5/2014 | Daikuhara |
| 8,718,294 B2 | 5/2014 | Terlizzi et al. |
| 8,770,855 B2 | 7/2014 | Miller |
| 8,772,654 B2 | 7/2014 | Tziviskos et al. |
| 8,834,040 B2 | 9/2014 | Schmidt et al. |
| 8,974,126 B2 | 3/2015 | Sloey et al. |
| 9,039,304 B2 | 5/2015 | Ko et al. |
| 9,046,261 B2 | 6/2015 | Zhang et al. |
| 9,057,184 B2 | 6/2015 | Meehan et al. |
| 9,063,300 B2 | 6/2015 | Torikai et al. |
| 9,068,327 B2 | 6/2015 | Granstrand |
| 9,131,043 B2 | 9/2015 | Hilbrink et al. |
| 9,170,389 B2 | 10/2015 | Register et al. |
| 9,194,110 B2 | 11/2015 | Frick et al. |
| 9,195,010 B2 | 11/2015 | Shimazu et al. |
| 9,333,698 B2 | 5/2016 | Devries et al. |
| 9,335,487 B2 | 5/2016 | Tanaka et al. |
| 9,347,207 B2 | 5/2016 | Chen |
| 9,461,417 B2 | 10/2016 | Zhang |
| 10,113,739 B2 * | 10/2018 | Schneider, II ........ F21V 33/004 |
| 2009/0094740 A1 | 4/2009 | Ji |
| 2011/0222266 A1 | 9/2011 | Beermann |
| 2012/0297534 A1 | 11/2012 | Itazu et al. |
| 2012/0305118 A1 | 12/2012 | Itazu et al. |
| 2014/0261780 A1 | 9/2014 | Thomas et al. |
| 2014/0270660 A1 | 9/2014 | Sheu |
| 2014/0359935 A1 | 12/2014 | Veros et al. |
| 2015/0207275 A1 | 7/2015 | Wegelin et al. |
| 2015/0292693 A1 | 10/2015 | Franke |
| 2015/0354185 A1 | 12/2015 | Tseng et al. |
| 2015/0354186 A1 | 12/2015 | Tseng et al. |
| 2016/0004017 A1 | 1/2016 | Zhao et al. |
| 2016/0154185 A1 | 6/2016 | Mori et al. |
| 2016/0208945 A1 | 7/2016 | Lance et al. |
| 2016/0266326 A1 | 9/2016 | Gniadek |
| 2016/0282564 A1 | 9/2016 | Little et al. |
| 2016/0299295 A1 | 10/2016 | Have et al. |

FOREIGN PATENT DOCUMENTS

| | | |
|---|---|---|
| CN | 203162289 | 8/2013 |
| CN | 104048089 | 9/2014 |
| CN | 204664595 | 9/2015 |
| DE | 1238735 B | 4/1967 |
| DE | 3045661 | 6/1982 |
| GB | 2344469 | 6/2000 |
| JP | S5645634 | 4/1981 |
| WO | WO 2007/082301 | 7/2007 |
| WO | WO 2008/094651 | 8/2008 |
| WO | WO 2009/075858 | 6/2009 |
| WO | WO 2011/021987 | 2/2011 |
| WO | WO 2011/087063 | 7/2011 |

OTHER PUBLICATIONS

Cui Inc.; Series: SJ-4351X/Description: 3.5 mm Audio Jack; dated Jun. 5, 2012.

Kingbright, Single Level Surface Mount CBI, Part No. WP130-LDF96, dated Aug. 3, 2016.

* cited by examiner

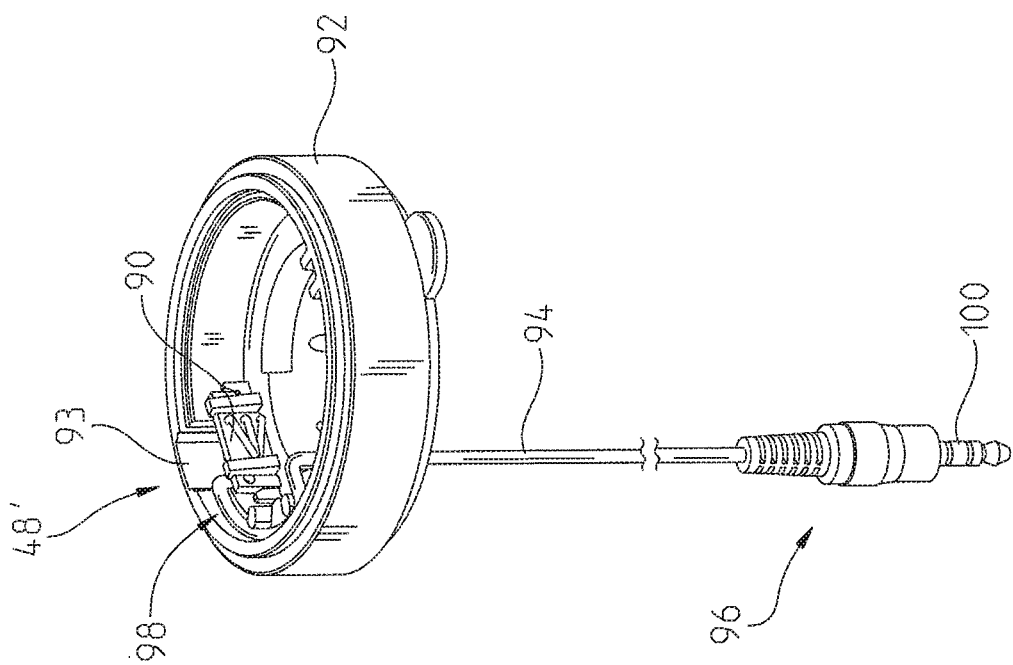
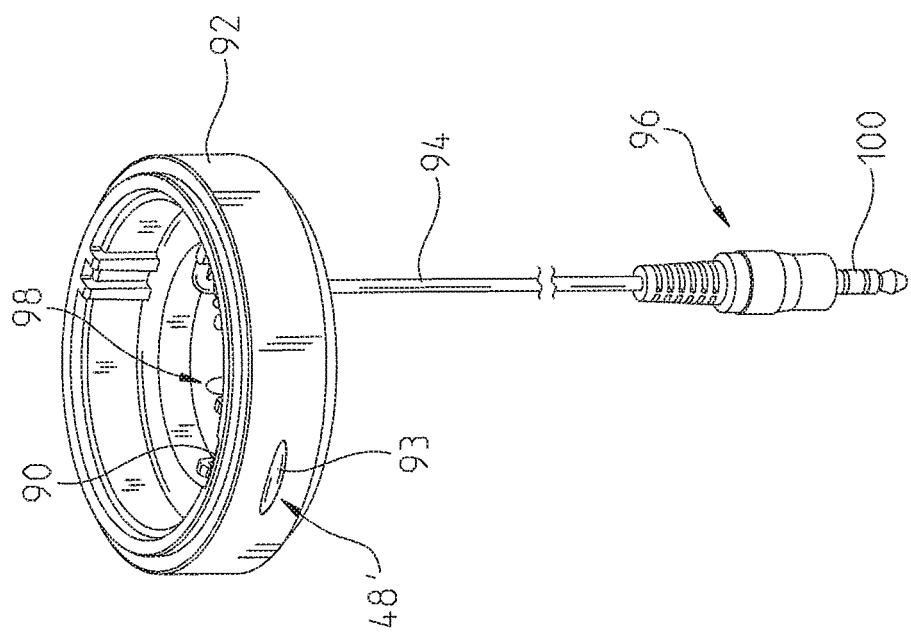

CONNECTOR FOR AN ELECTRONIC FAUCET

CROSS-REFERENCE TO RELATED APPLICATION

The present application is a divisional application of U.S. patent application Ser. No. 15/400,710, filed Jan. 6, 2017, the disclosure of which is expressly incorporated herein by reference.

BACKGROUND AND SUMMARY

The present disclosure relates generally to a fluid delivery apparatus. More particularly, the present disclosure relates a connector for supplying light to an electronic faucet.

It is known to provide visual indicators on electronic faucets. One such visual indicator may be a light source (such as a light emitting diode (LED)) positioned above a sink deck and below a faucet spout. In another illustrative embodiment, the visual indicator may be provided by a light source (such as a light emitting diode (LED)) positioned below the sink deck, where light is transmitted from the light source to above the sink deck via a light pipe.

The present invention provides a connector for a visual indicator of an electronic faucet. More particularly, the connector is configured to alternately receive an optical plug of a light pipe, and an electrical plug of an above deck light emitter. Additionally, the connector is configured to distinguish between the coupling of the optical plug of the light pipe and the electrical plug of the light emitter.

According to an illustrative embodiment of the present disclosure, an electronic faucet includes a first faucet component supported on a first side of a mounting member, the first faucet component including a water outlet, and a light outlet operably coupled to the first faucet component and positioned on the first side of the mounting member. A second faucet component is supported on a second side of the mounting member, the second faucet component including a connector having a socket, and a first light source operably coupled to the connector for emitting light into the socket. A light pipe includes an optical plug having an inlet opening in communication with the first light source, and an outlet opening in communication with the light outlet.

According to another illustrative embodiment of the present disclosure, an electronic faucet includes a delivery spout, a fluid supply conduit supported by the delivery spout and including a water outlet, a connector including a socket, and a light source operably coupled to the socket and configured to supply light to the socket. A light outlet is operably coupled to the delivery spout, and a conduit is in communication with the light source. The conduit is one of an electrical cable including an electrically conductive plug, or a light pipe including an electrically non-conductive plug with an inlet opening. The socket includes a plug detecting contact configured to detect which of the electrically plug and the electrically non-conductive plug is received within the socket, and activation of the light source is controlled in response thereto.

According to a further illustrative embodiment of the present disclosure, a connector for an electronic faucet includes a housing defining a socket and a light inlet, and a plug detecting contact received within the socket and configured to distinguish between an electrically conductive plug and an electrically non-conductive plug received within the socket. A first power contact is received within the socket and is configured to supply power to the electrically conductive plug. A light source is in communication with the light inlet for supplying light to the socket.

According to another illustrative embodiment of the present disclosure, a method of operating an electronic faucet includes the steps of providing a light outlet, providing a connector including a socket, and a first light source operably coupled to the socket for supplying light to the socket. The method further includes the steps of deactivating the first light source by inserting an electrically conductive plug of an electrical cable into the socket, and activating the first light source by inserting an electrically non-conductive plug of a light pipe into the socket.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF DRAWINGS

The detailed description of the drawings particularly refers to the accompanying features, in which:

FIG. 6A is a first perspective view of a further illustrative light outlet coupled to the electrical cable of FIG. 2;

FIG. 6B is a second perspective view of the illustrative light outlet of FIG. 6A;

DETAILED DESCRIPTION OF THE DRAWINGS

Figure 1:
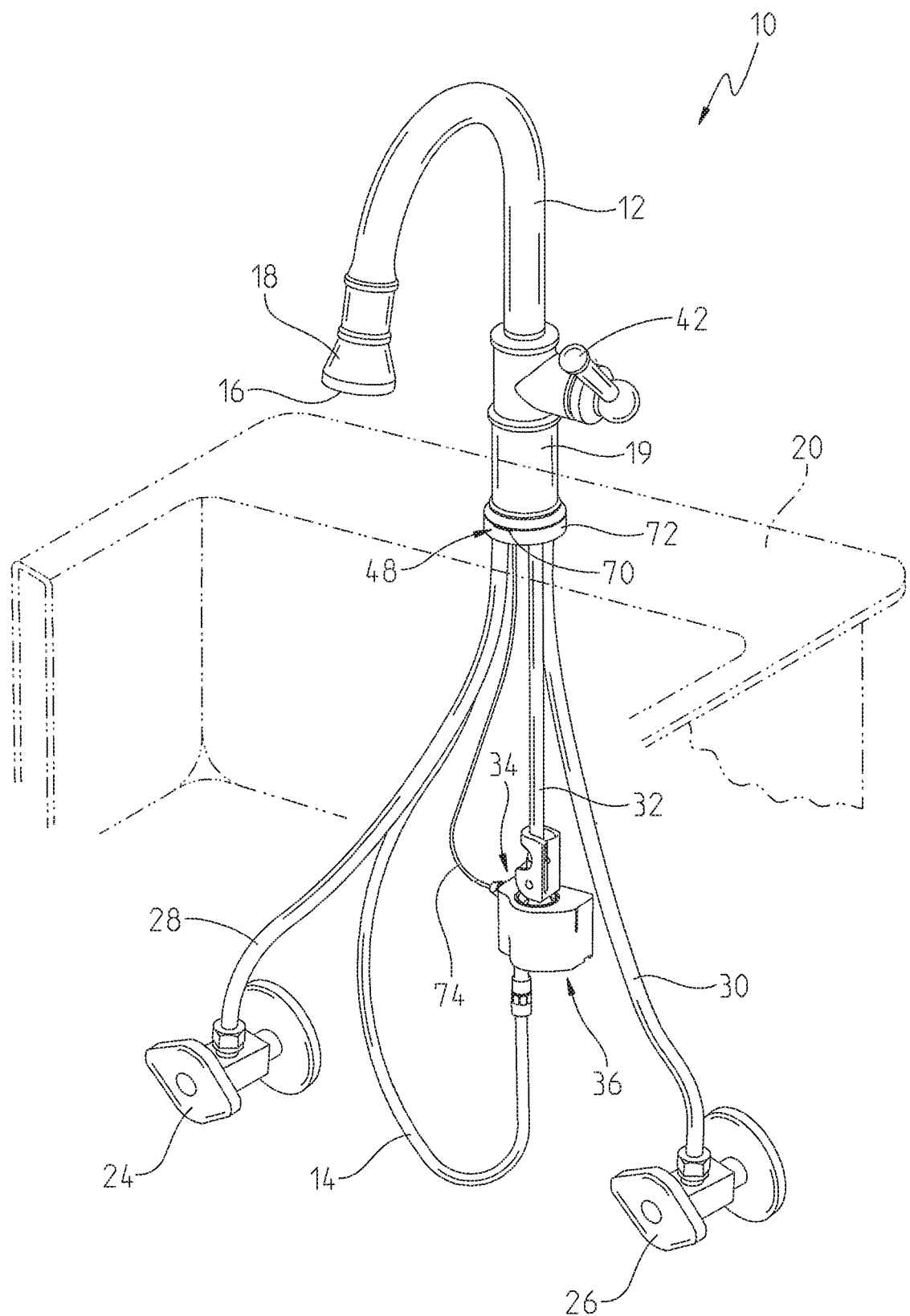
FIG. 1 is a perspective view of an illustrative electronic faucet coupled to a sink deck, and including a connector optically coupling a light source to a light pipe.

For the purposes of promoting an understanding of the principles of the present disclosure, reference will now be made to the embodiments illustrated in the drawings, which are described herein. The embodiments disclosed herein are not intended to be exhaustive or to limit the invention to the precise form disclosed. Rather, the embodiments are chosen and described so that others skilled in the art may utilize their teachings. Therefore, no limitation of the scope of the claimed invention is thereby intended. The present invention includes any alterations and further modifications of the illustrated devices and described methods and further applications of the principles of the invention which would normally occur to one skilled in the art to which the invention relates.

With reference to FIG. 1, an illustrative electronic faucet 10 includes a delivery spout 12 supporting a passageway or fluid conduit 14 for delivering fluids, such as water, from an outlet 16. The outlet 16 may be supported by a pull-down sprayhead 18 removably coupled to the spout 12. The faucet 10 illustratively includes a hub 19 supported by a mounting member, illustratively a sink deck 20.

Figure 3:
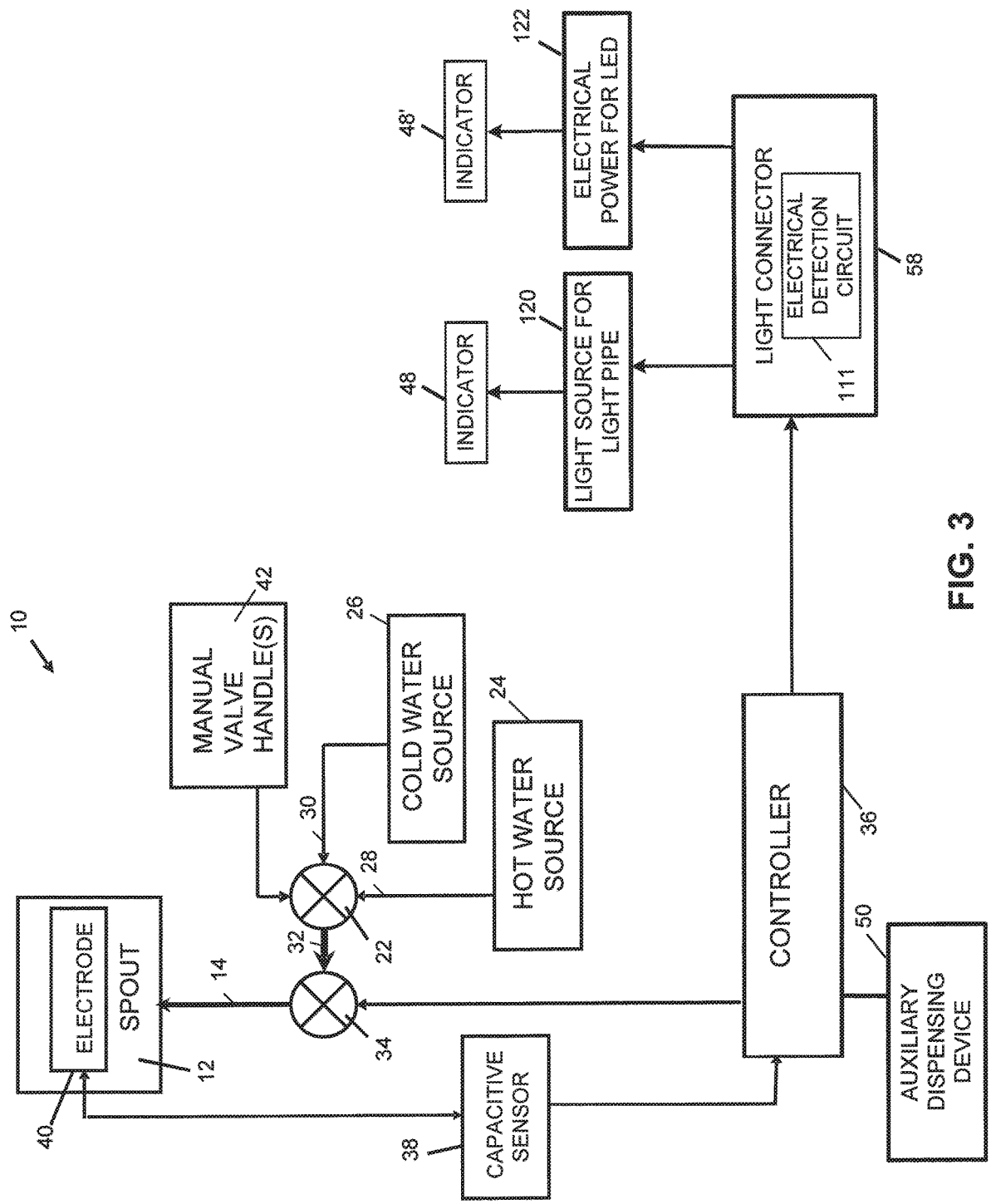
FIG. 3 is a block diagram of an illustrative electronic faucet.

With reference to FIG. 3, the electronic faucet 10 illustratively includes a manual valve 22 in fluid communication with hot and cold water sources 24 and 26 via fluid conduits 28 and 30, respectively. A fluid conduit 32 fluidly couples the manual valve 22 to an electrically operable valve, such as a solenoid valve 34.

Solenoid valve 34 is illustratively controlled electronically by a controller 36. In the illustrative embodiment, controller 36 is configured to open and close solenoid valve 34 to turn on and off the fluid flow to the outlet 16 of the spout 12. In another illustrative embodiment, controller 36 is further configured to proportionately control solenoid valve 34 to adjust the flow rate of the fluid flowing through the outlet 16 of the spout 12. In an illustrative embodiment described herein, solenoid valve 34 includes a pilot operated solenoid valve, although other suitable electrically operable or actuator driven valves may be substituted therefor.

In the illustrative embodiment, the controller 36 controls the solenoid valve 34 based on output from at least one sensor, such as a proximity sensor and/or a touch sensor, for example, to turn on and off fluid flow through the spout 12. In the illustrative embodiment, a capacitive sensor 38 is in communication with the controller 36 for providing signals to controller 36 indicating the detection of an object (e.g., a user's hands) on or near spout 12. Other suitable sensors may be provided for detecting an object near the faucet 10. An electrode 40 of the capacitive sensor 38 is illustratively coupled to spout 12 to detect the object contacting the spout 12. The electrode 40 may be positioned in other suitable areas of faucet 10 for detecting the presence of a user's hands.

In some embodiments, by sensing capacitance changes with the capacitive sensor 38, the controller 36 is configured to make logical decisions to control different modes of operation of faucet 10 such as changing between a manual mode of operation and a hands free mode of operation as described in U.S. Pat. Nos. 7,537,023; 7,690,395; 7,150, 293; 7,997,301; and PCT International Patent Application Publication Nos. WO 2008/094651 and WO 2009/075858, the disclosures of which are all expressly incorporated herein by reference.

In an illustrative embodiment, manual adjustment of water temperature and flow rate may be provided after opening the solenoid valve 34 by manipulating a manual valve handle 42, which is operably coupled to the manual valve 22, illustratively a conventional mixing valve. In particular, the manual valve handle 42 may be used to manipulate the manual valve 22 positioned in the passageway of the spout 12 to adjust the temperature and/or flow of fluid from the hot and cold water sources 24 and 26 to the solenoid valve 34. Alternatively, separate manual valve handles 42 may be provided for each of the hot and cold water sources 24 and 26. Alternatively, the electronic faucet 10 may be a fully automatic faucet without any manual controls.

Figure 4:
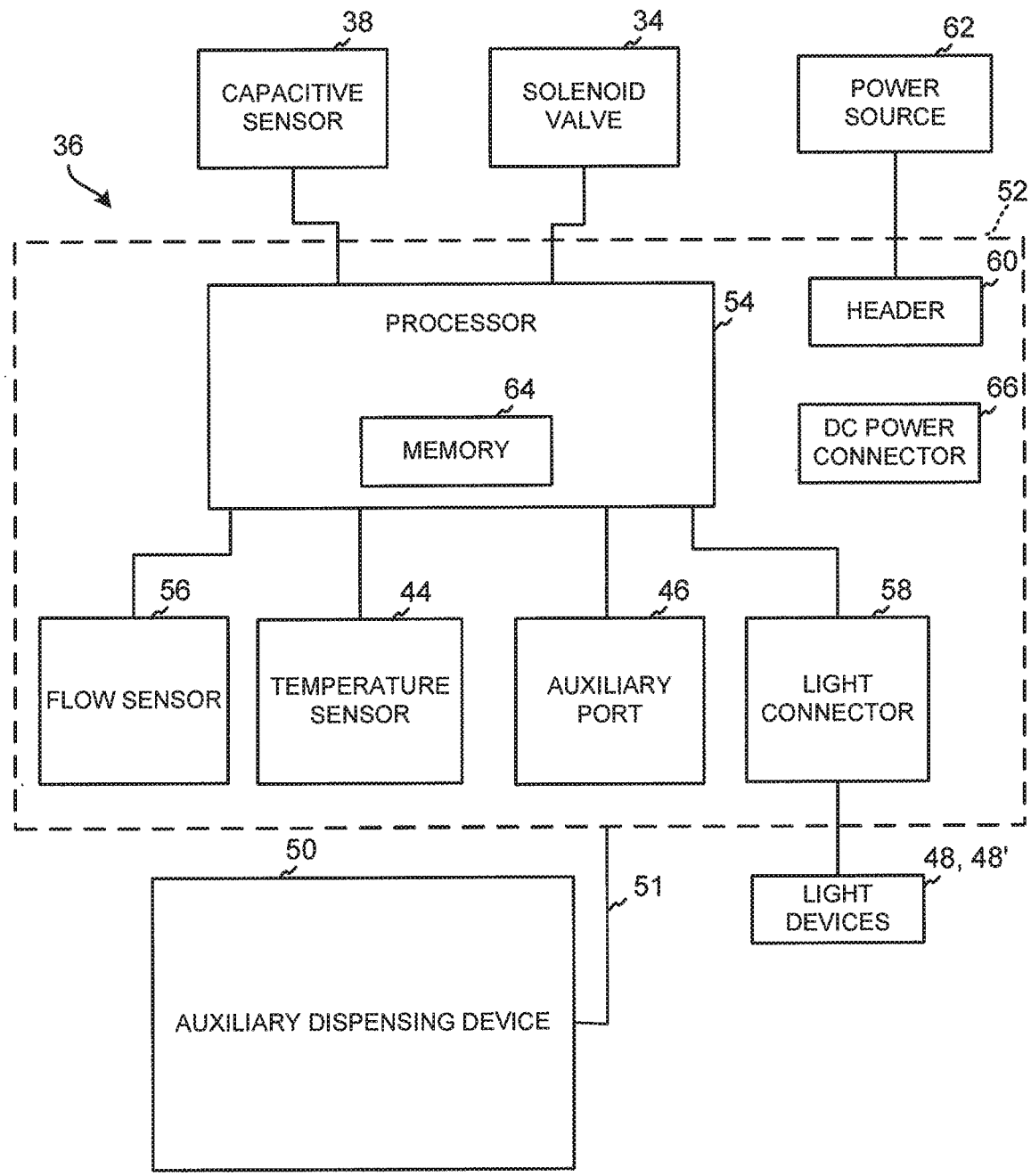
FIG. 4 is a block diagram of an illustrative controller of the electronic faucet of FIG. 3.

In an alternative embodiment, the controller 36 may further control the valve 22 electronically. In particular, the valve 22 may include an electronic proportioning or mixing valve that is adjusted by controller 36 to control the mixture of hot and cold water and thus the temperature of the water flowing through spout 12. Exemplary electronically controlled mixing valves are described in U.S. Pat. No. 7,458, 520 and PCT International Patent Application Publication No. WO 2007/082301, the disclosures of which are expressly incorporated by reference herein. The amount of fluid flowing from the hot water source 24 and the cold water source 26 may be controlled by the controller 36 based on one or more user inputs, such as desired fluid temperature, desired fluid flow rate, desired fluid volume, various task based inputs, various recognized presentments, and/or combinations thereof. For example, the faucet 10 may include a temperature sensor 44 in fluid communication with the output of the proportioning valve to provide feedback to the controller 36 for use in controlling the water temperature. In one illustrative embodiment, the controller 36 controls the proportional valve via an auxiliary port 46 (FIG. 4).

In an illustrative embodiment, the faucet 10, 10' includes one or more light outlets or visual indicators 48, 48' controlled by the controller 36 to provide a visual indication of the operational mode (e.g., hands free and/or touch mode) and/or water temperature of water dispensed from the outlet 16 of the electronic faucet 10, 10'. Illustratively, the visual indicators 48, 48' are operative to indicate operating mode and/or the temperature of the water flowing through the faucet 10, 10' based on the selective illumination of different colored light emitting diodes (LEDs) or a single multi-colored light emitting diode (LED).

In the illustrated embodiment, the controller 36 is operative to control another remote dispensing device in addition to the electronic faucet 10, illustratively auxiliary dispensing device 50. An exemplary auxiliary dispensing device 50 may include a soap dispenser, another faucet spout, a beverage dispenser, or another suitable dispensing device. The auxiliary dispensing device 50 may be positioned adjacent the same sink basin as the spout 12. Alternatively, the dispensing device 50 may be positioned to dispense into a different sink basin, such as another sink basin in a bathroom or kitchen or in another room, for example. As described in detail herein, the controller 36 includes an auxiliary port 46 for remotely controlling and powering the auxiliary dispensing device 50 via a cable 51 (FIG. 4).

The controller 36 illustratively includes a printed circuit board 52 and multiple circuit components mounted to the printed circuit board 52. Illustratively, a processor 54, a flow sensor 56, the temperature sensor 44, the auxiliary port 46, and a light connector 58 are coupled to the circuit board 52. A connection header 60 is illustratively coupled to the circuit board 52 for coupling a power line from an external power source 62. In one illustrative embodiment, the power source 62 is a battery power supply or other direct current (DC) power supply. Internal or external memory 64 of the processor 54 includes software and/or firmware containing instructions executed by the processor 54 for controlling the solenoid valve 34, other components of the faucet 10, and other dispensing devices (e.g., auxiliary dispensing device 50). The processor 54 controls the solenoid valve 34 based on output from the capacitive sensor 38, the flow sensor 56, and/or the temperature sensor 44. In the exemplary embodiment, the controller 36 also includes a power connector 66 for coupling the controller 36 to a wall outlet or other building power supply to power the controller 36. The power connector 66 illustratively includes a rectifier to convert alternating current (AC) power to DC power levels suitable for controller 36. The solenoid valve 34 and the controller 36 are illustratively received within an outer housing or casing 68.

Figure 5B:
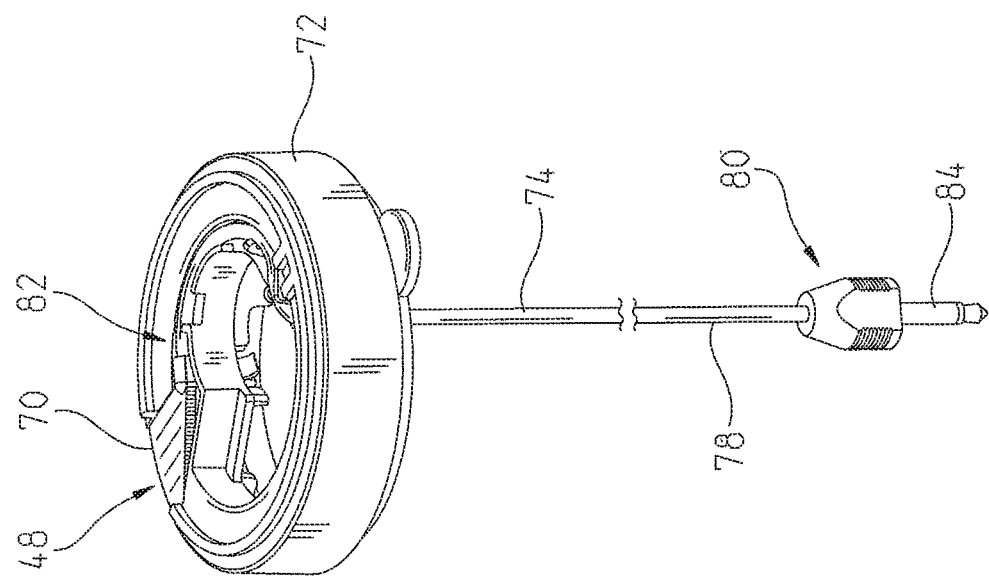
FIG. 5B is a second perspective view of the illustrative light outlet of FIG. 5A.
Figure 5A:
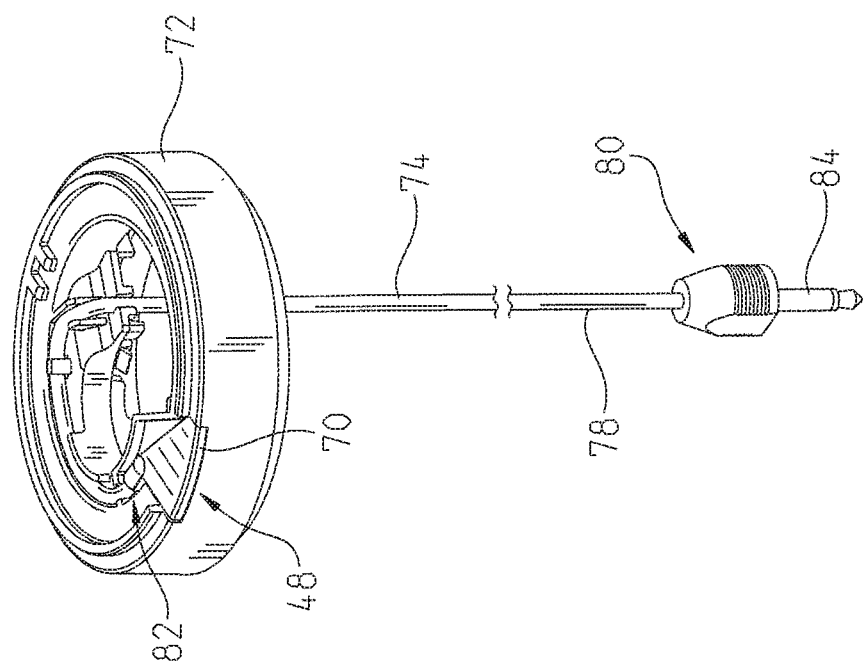
FIG. 5A is a first perspective view of an illustrative light outlet optically coupled to the light pipe of FIG. 1.
Figure 7:
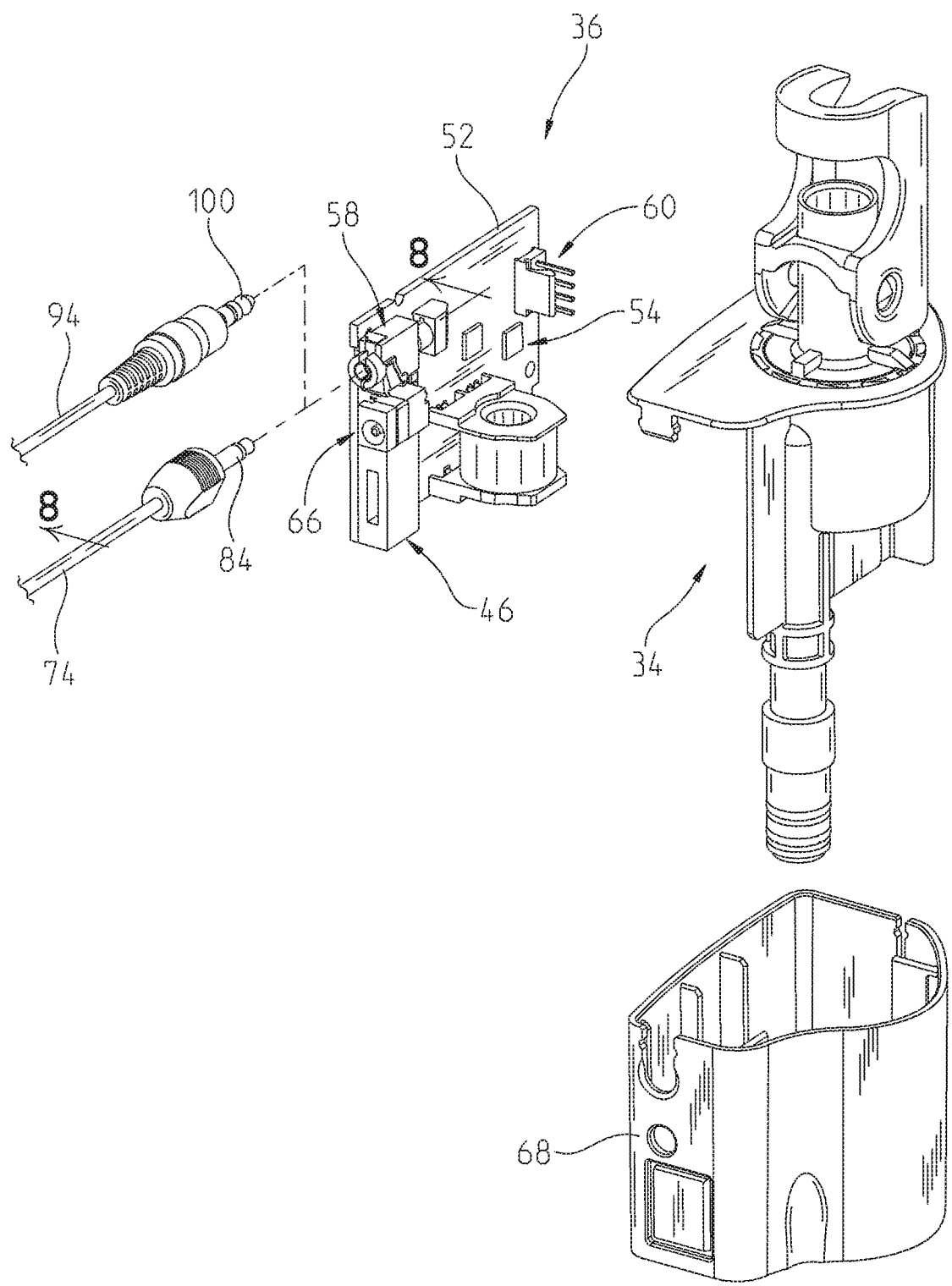
FIG. 7 is a partially exploded perspective view of the solenoid valve and the controller of the illustrative faucets of FIGS. 1 and 2.
Figure 8:
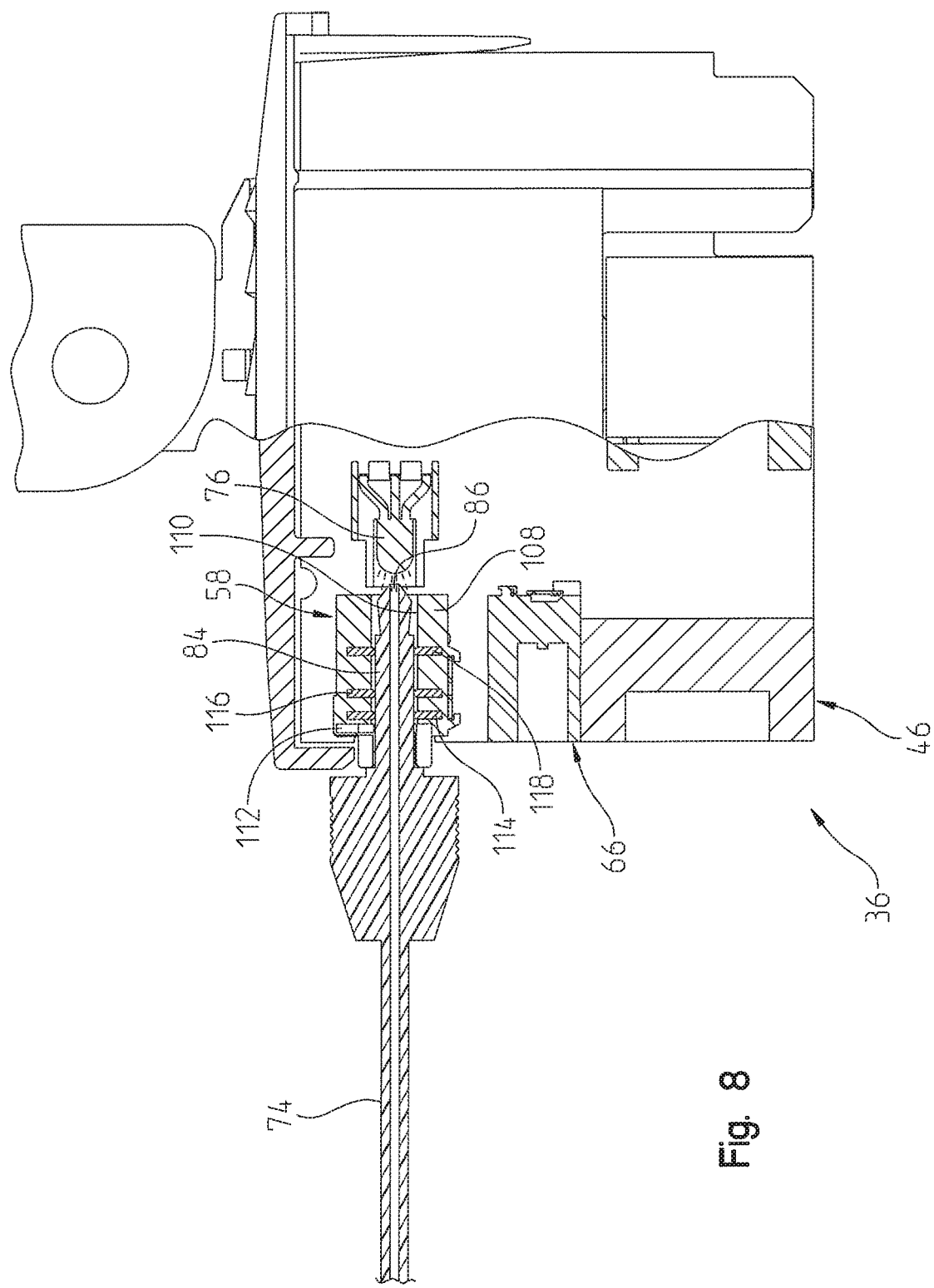
FIG. 8 is a first cross-sectional view of the solenoid valve and the controller of FIG. 7, showing an optical plug of the light pipe of FIG. 1 coupled to the connector.
Figure 9:
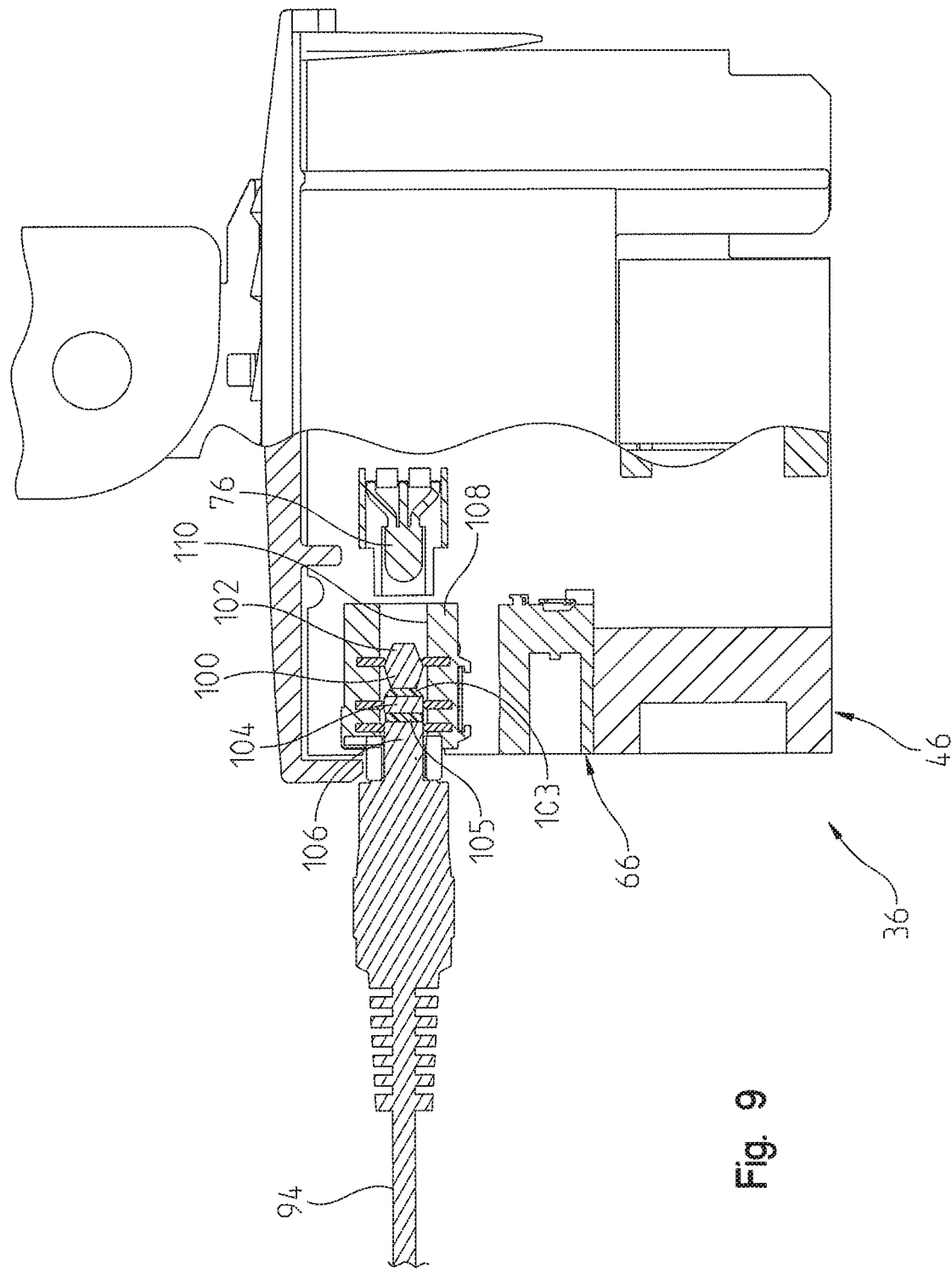
FIG. 9 is a second cross-sectional view of the solenoid valve and the controller of FIG. 7, showing the electrically conductive plug of the electrical cable of FIG. 2 coupled to the connector.
Figure 10:
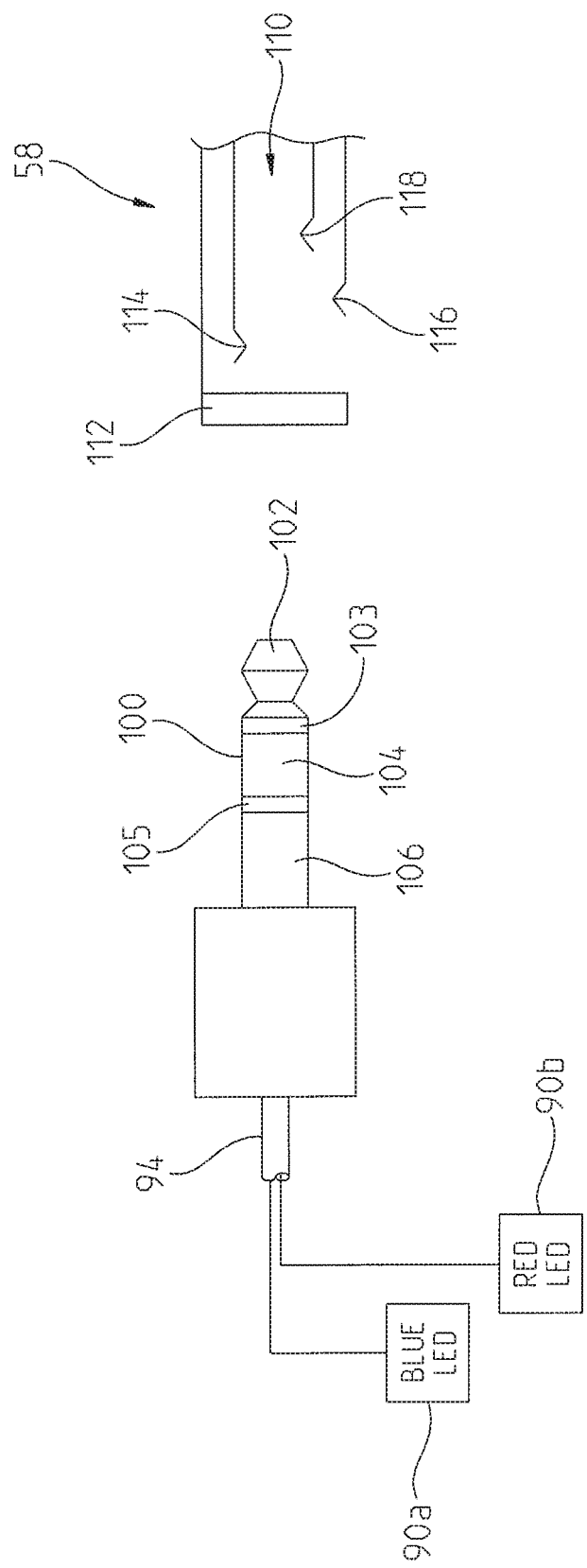
FIG. 10 is a diagrammatic view of the connector and the electrically conductive plug of FIG. 9.

FIGS. 1, 5A, 5B and 8 show a first illustrative embodiment faucet 10 including visual indicator or light outlet 48 coupled to the delivery spout 12. With reference to FIGS. 5A and 5B, the light outlet 48 is illustratively defined by a lens or diffuser 70 supported by a base ring 72 positioned above the sink deck 20 and below the hub 19 of the delivery spout 12. A conduit, illustratively a light pipe 74, is optically coupled to a first light source or light emitter 76 and the lens 70. More particularly, the light pipe 74 illustratively includes a polymer tube 78 extending between an inlet end 80 and an outlet end 82, and configured to transmit light from the first light source 76 therethrough. The first light source 76 illustratively comprises a bicolored light emitting diode (LED). An optical plug 84, illustratively electrically non-conductive (e.g., formed of a polymer), is supported by the inlet end 80 of the light pipe 74. The optical plug 84 illustratively includes an inlet opening 86 to receive light from the first light source 76 (FIG. 8). The optical plug 84 may be a conventional mini-TOSLINK connector. The light pipe 74 transmits the light from the inlet end 80 to the outlet end 82 for dispersion by the lens 70 within the base ring 72.

FIGS. 2, 6A, 6B and 9 show a second illustrative embodiment faucet 10' including visual indicator or light outlet 48' coupled to the delivery spout 12. Faucet 10' includes many similar components as faucet 10, wherein similar components are identified with like reference numbers. With reference to FIGS. 6A and 6B, the light outlet 48' is illustratively defined by a second light source or light emitter 90 supported by a base ring 92 positioned above the sink deck 20 and below the hub 19 of the delivery spout 12. The second light source 90 illustratively comprises a blue light emitting diode (LED) 90a and a red light emitting diode (LED) 90b.

A lens or diffuser 93 is illustratively supported by the base ring 92 in front of the light emitter 90. A conduit, illustratively an electrical cable 94, is electrically coupled to the light emitter 90. The electrical cable 94 is configured to transmit electricity between an inlet end 96 and an outlet end 98. An electrically conductive plug 100 is coupled to the inlet end 96 of the electrical cable 94, while the light emitter 90 is coupled to the outlet end 98. The plug 100 is illustratively a conventional tip-ring-sleeve (TRS) plug including a tip contact 102, a ring contact 104 and a sleeve contact 106. The tip contact 102 is separated from the ring contact 104 by a first ring insulator 103, and the ring contact 104 is separated from the sleeve contact 106 by a second ring insulator 105.

Figure 2:
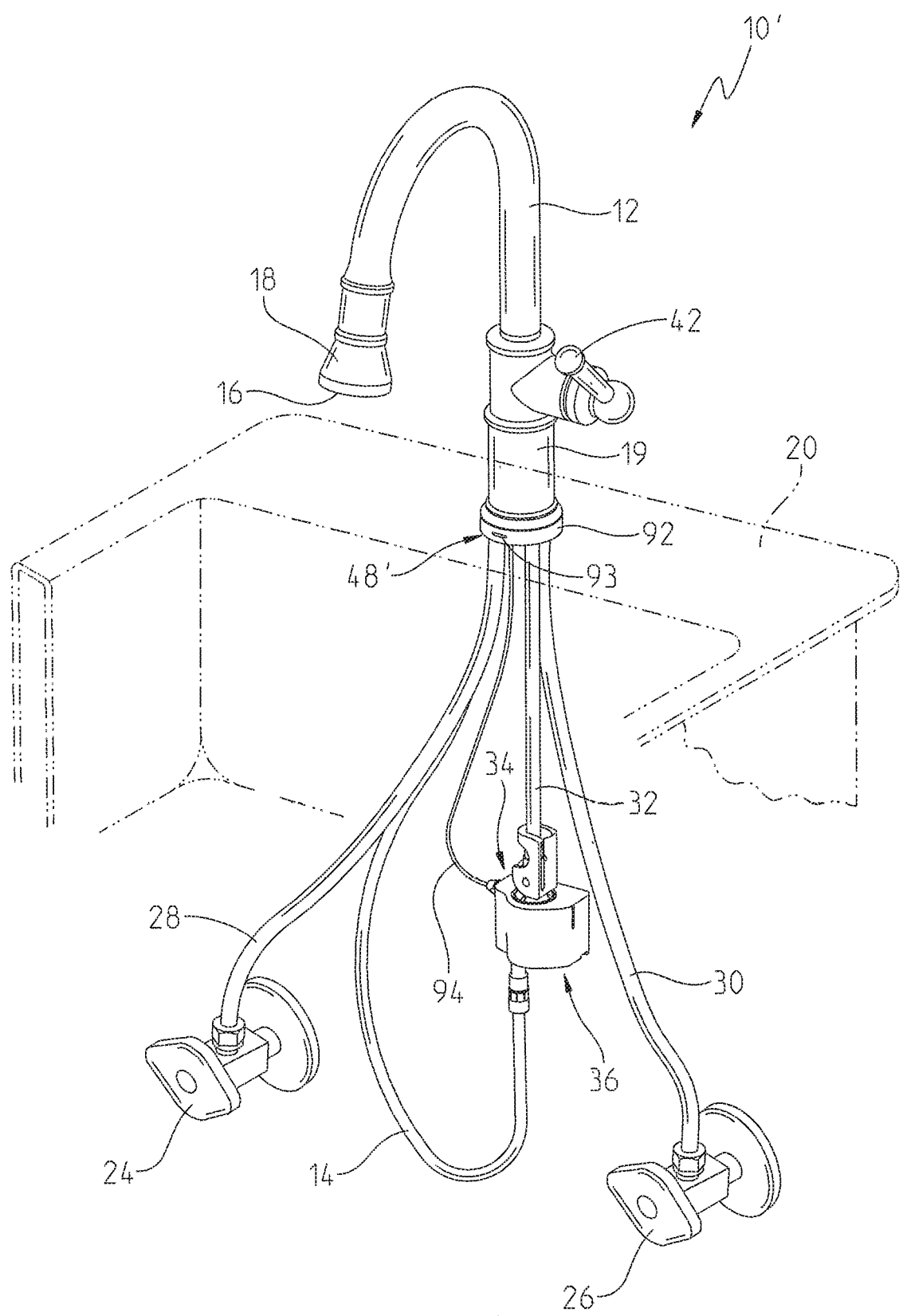
FIG. 2 is a perspective view of a further illustrative embodiment faucet coupled to a sink deck, and including the connector of FIG. 1 electrically coupled to a light source through an electrical cable.

The light connector 58 is positioned below the sink deck 20 and is operably coupled to the light outlet 48 of faucet 10 in the first configuration (FIG. 1) and is operably coupled to the light outlet 48' of faucet 10' in the second configuration (FIG. 2). The illustrative light connector 58 includes a housing 108 defining a socket 110. The first light source 76 is operably coupled to the socket 110 and is configured to supply light to the socket 110.

The connector 58 illustratively includes an electrical detection circuit 111 configured to distinguish between the first configuration faucet 10 including light outlet 48 of FIG. 1, and the second configuration faucet 10' including light outlet 48' of FIG. 2. More particularly, a first plug detecting contact 112 and a second plug detecting contact 114 are supported within the socket 110. A first power contact 116 and a second power contact 118 are likewise supported within the socket 110 and are in electrical communication with the power source 62. The contacts 112, 114, 116 and 118 are illustratively metal spring fingers biased radially inwardly into the socket 110, which is illustratively a 3.5 mm jack of the type used for audio headphone connections. The electrical detection circuit 111 is in electrical communication with the contacts 112, 114, 116 and 118 and may comprise an n-channel, p-channel MOSFET pair with a pull-up resistor to turn on/off power to the first light source 76 when different plugs (electrically non-conductive and electrically conductive 84 and 100) are inserted. Alternatively, detection of different plugs 84 and 100 may be through operation of the controller 36 through logic programming of the processor 54. As such, the controller 36 may replace the separate electrical detection circuit 111.

Additional details of illustrative solenoid valve 34 and controller 36 are provided in U.S. Patent Application Publication No. 2014/0261780 to Thomas et al., the disclosure of which is expressly incorporated herein by reference.

In an illustrative operation of the electronic faucet 10 in the first configuration of FIGS. 1, 5A, 5B and 8, the socket 110 cooperates with the electrical detection circuit 111 of the light connector 58 to distinguish between the electrically non-conductive plug 84 and the electrically conductive plug 100. When the electrically non-conductive plug 84 is inserted into the socket 110, no electrical connection is made between the plug 84 and the first plug detecting contact 112, the second plug detecting contact 114, the first power contact 116 and the second power contact 118. In response, power is supplied from the power source 62 to activate the first light source 76 (as represented by block 120 in FIG. 3). Light from the first light source 76 is supplied to the socket 110 and transmitted from the inlet opening 86 through the light pipe 74 to the outlet end 82, emitted through the lens 70, and projected outwardly from the base ring 72 (representing illumination of indicator 48).

In an illustrative operation of the electronic faucet 10' in the second configuration of FIGS. 2, 6A, 6B and 9, the socket 110 cooperates with the electrical detection circuit 111 of the light connector 58 of the light connector 58 to again distinguish between the electrically non-conductive plug 84 and the electrically conductive plug 100. When the electrically conductive plug 100 is inserted into the socket 110, the first plug detecting contact 112 is electrically coupled to the second plug detecting contact 114 (i.e., electrically bridged or shorted). More particularly, the sleeve contact 106 of the plug 100 electrically couples the first plug detecting contact 112 and the second plug detecting 114 of the socket 110. In response, the electrical detection circuit 111 deactivates the first light source 76. Simultaneously, the first power contact 116 and the second power contact 118 are electrically coupled to the second light source 90. More particularly, power is transmitted from the first power contact 116 to the ring contact 104 to cause illumination of the blue LED 90a, while power from the second power contact 118 is transmitted from to the tip contact 102 to cause illumination of the red LED 90b (as represented by block 122 in FIG. 3). As such, the second light source 90 is active and emits light through the lens 93, which is diffused outwardly from the base ring 92 (representing illumination of indicator 48').

While this disclosure has been described as having exemplary designs, the present disclosure can be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A method of operating an electronic faucet, the method comprising the steps of:
   providing a light outlet;
   providing a connector including a socket, and a first light source operably coupled to the socket;
   deactivating the first light source by inserting an electrically conductive plug of a wire into the socket; and
   activating the first light source by inserting an electrically non-conductive plug of a light pipe into the socket, the first light source emitting light to the light outlet.

2. The method of claim 1, wherein the first light source is positioned below a mounting deck.

3. The method of claim 2, wherein light from the first light source is transmitted through the light pipe to the light outlet.

4. The method of claim 1, further comprising the steps of providing a second light source, and activating the second light source by inserting the electrically conductive plug into the socket.

5. The method of claim 1, further comprising the step of providing a first faucet component on a first side of a mounting member, the first faucet component including a water outlet, wherein the light outlet is operably coupled to the first faucet component and positioned on the first side of the mounting member.

6. The method of claim 5, wherein the first faucet component comprises a delivery spout.

7. The method of claim 6, further comprising a base ring supported below the delivery spout, the base ring including a lens operably coupled to the light outlet.

8. The method of claim 5, further comprising the step of providing a second faucet component on a second side of the mounting member, the second faucet component including the connector and the first light source.

9. The method of claim 8, wherein the second faucet component includes a controller and an electrically operable valve coupled to the controller to control fluid flow through the water outlet.

10. The method of claim 1, wherein the socket includes a plug detecting contact, and the step of deactivating the first light source includes the plug detecting contact detecting the electrically conductive plug.

11. An electronic faucet comprising:
    a light outlet;
    a connector including a socket, and a first light source operably coupled to the socket;
    wherein the first light source is deactivated by inserting an electrically conductive plug of a wire into the socket; and
    wherein the first light source is activated by inserting an electrically non-conductive plug of a light pipe into the socket, the first light source being coupled to the light outlet by the light pipe.

12. The electronic faucet of claim 11, wherein the first light source is positioned below a mounting deck.

13. The electronic faucet of claim 12, wherein light from the first light source transmits light through the light pipe to the light outlet.

14. The electronic faucet of claim 11, further comprising a second light source, wherein the second light source is activated by inserting the electrically conductive plug into the socket.

15. The electronic faucet of claim 11, further comprising a first faucet component supported on a first side of a mounting member, the first faucet component including a water outlet, wherein the light outlet is operably coupled to the first faucet component and positioned on the first side of the mounting member.

16. The electronic faucet of claim 15, wherein the first faucet component comprises a delivery spout.

17. The electronic faucet of claim 16, further comprising a base ring supported below the delivery spout, the base ring including a lens operably coupled to the light outlet.

18. The electronic faucet of claim 15, further comprising a second faucet component on a second side of the mounting member, the second faucet component including the connector and the first light source.

19. The electronic faucet of claim 18, wherein the second faucet component includes a controller and an electrically operable valve coupled to the controller to control fluid flow through the water outlet.

20. The electronic faucet of claim 11, wherein the socket includes a plug detecting contact, and the step of deactivating the first light source includes the plug detecting contact detecting that the plug is electrically conductive.

* * * * *